(12) United States Patent
Ehrman

(10) Patent No.: US 6,304,889 B1
(45) Date of Patent: Oct. 16, 2001

(54) EXPONENTIAL OPTIMIZATION

(75) Inventor: John Robert Ehrman, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/195,313

(22) Filed: Nov. 18, 1998

(51) Int. Cl.⁷ .................................................. G06F 7/556
(52) U.S. Cl. ............................................................ 708/606
(58) Field of Search .............................. 708/606; 712/221

(56) References Cited

U.S. PATENT DOCUMENTS

| | | | | |
|---|---|---|---|---|
| 4,225,933 | * | 9/1980 | Monden | 708/606 |
| 5,177,702 | * | 1/1993 | Lindsley | 708/606 |
| 6,128,638 | * | 10/2000 | Thomas | 708/606 |

OTHER PUBLICATIONS

*IBM Program Product: IBM System/360 OS Fortran IV Mathematical and Serivice Subprograms Supplement for MOD I and MOD II Libraries*, first edition (Mar. 1971), see p. 20.

Donald E. Knuth, *Seminumerical Algorithms, The Art of Computer Programming*, vol. 2 second edition (1981), "Evaluation of Powers", see pp. 441–467.

*IBM System/360 Operating System Fortran IV Library—Mathematical and Service Subprograms*, IBM Systems Reference Library, Program No. 360S–LM–501, second edition (Sep. 1972), see pp. 41–42.

*IBM vs Fortran Version 2 Language and Library Reference*, Release 1.1, second edition (Sep. 1986), see pp. 430–431.

Donald E. Knuth, *Seminumerical Algorithms, The Art of Computer Programming*, vol. 2 (second Edition) 1981, "Answers to Exercises," see pp. 632–639.

* cited by examiner

*Primary Examiner*—David H. Malzahn
(74) *Attorney, Agent, or Firm*—Gates & Cooper LLP

(57) ABSTRACT

An exponential function on a base X raised to a power of N is performed in a processor in a manner that maximizes computing efficiency. The exponential function initially positions at a starting node in an exponential tree stored in a memory of the processor, wherein the starting node represents the value of N. A working value W is created in the memory of the processor and the working value W is initially set equal to the base X. The exponential tree is traversed in the memory of the processor from the starting node to an answer node and the working value W is updated in the memory of the processor at each node encountered during the traversal. The working value is squared in the memory of the processor when a next node is above and to the right of the current node. Otherwise, the working value is squared in the memory of the processor and a result thereof is multiplied by X in the memory of the processor when the next node is above and to the left of the current node. This working value W is finally outputted as a result of the exponential function.

36 Claims, 4 Drawing Sheets

EXPONENTIAL OPTIMIZATION

BACKGROUND OF THE INVENTION

1. Field of the Invention

The present invention relates generally to the implementation of an exponential function in computers, and, in particular, to an optimal set of instructions for performing an exponential function.

2. Description of the Related Art

One of the most important and widely used mathematical library functions in nearly every computer is one to evaluate integer powers of "real" or floating-point numbers. For example, the notation X**N (where X is usually called the base and N is called the exponent or power) is used in nearly every high-level language to represent this operation, in expressions such as "AREA=PI*R**2".

Prior art implementations generally involve looking at the binary representation of the exponent N, and doing successive floating point squaring of X and/or multiplications by X or X**2. This technique is currently used in the mathematical function libraries of Fortran, PL/I, COBOL, Pascal, APL, etc.

The primary shortcoming of the prior art is that the "bookkeeping overhead" of determining the bits of N and figuring out whether or not to square or multiply takes more instructions than for the actual evaluations. In early computers, floating point operations were relatively slow, so this was a reasonable approach. Now that floating point operations are fairly fast, the ratio of "useful" work to "overhead" is low.

Thus, there is a need in the art for improved methods of performing exponential functions.

SUMMARY OF THE INVENTION

To overcome the limitations in the prior art described above, and to overcome other limitations that will become apparent upon reading and understanding the present specification, the present invention discloses a method, apparatus, and article of manufacture for performing an exponential function on a base X raised to a power of N in a manner that maximizes computing efficiency, as well as a data and/or code structure for use when the function is performed. The exponential function initially positions at a starting node in an exponential tree stored in a memory, wherein the starting node represents the value of N. A working value W is created in the memory and the working value W is initially set equal to the base X. The exponential tree is traversed from the starting node to an answer node and the working value W is updated at each node encountered during the traversal. The working value is squared when a next node is above and to the right of the current node. Otherwise, the working value is squared and a result thereof is multiplied by X when the next node is above and to the left of the current node. This working value W is finally outputted as a result of the exponential function when the root of the tree is reached.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and in which is shown by way of illustration embodiments of the invention. It is understood that other embodiments may be utilized and structural changes may be made without departing from the scope of the present invention.

Overview

The present invention provides an optimized method for performing exponential functions in a computer. The essence of the invention is a faster way to evaluate the function than used in previous implementations. The invention reduces the amount of this "overhead" work to the necessary minimum.

This is done by trading extra code for fewer executed instructions, wherein the extra code is an "evaluation tree". A decision is made early in the evaluation as to which path in the evaluation tree to follow, and a branch is made to the proper point in the path; the set of possible paths takes the form of a tree.

It is worth noting that the invention is independent of how floating point numbers and integers are represented in the processor, so it would apply to nearly all current processor architectures.

Hardware Environment

Figure 1:
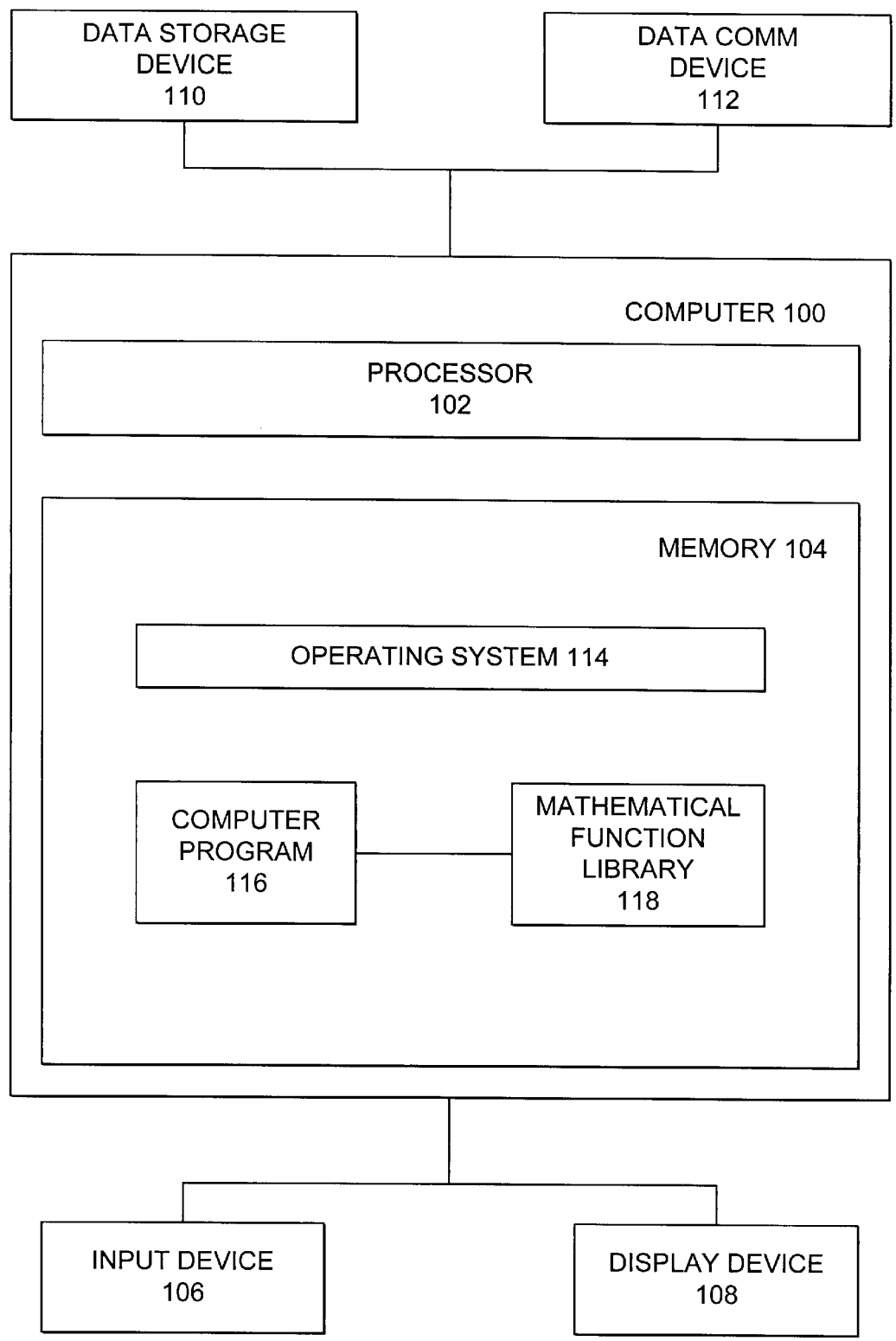
FIG. 1 is a block diagram illustrating an exemplary hardware environment and programs stored in memory in accordance with the present invention.

FIG. 1 is a block diagram illustrating an exemplary hardware environment used to implement the preferred embodiments of the present invention. In the exemplary hardware environment, a computer 100 may include, inter alia, a processor 102, memory 104 (e.g., random access memory (RAM), read-only memory (ROM)), an input device 106 (e.g., keyboard, mouse pointing device, etc.), display 108 (e.g., CRT, LCD, etc.), as well as a data storage device 110 (e.g., fixed, floppy, and/or CD-ROM disk drives, etc.), and/or data communication device 112 (e.g. modems, network interfaces, etc.). It is envisioned that attached to the computer 100 may be other devices such as a read only memory (ROM), a video card, bus interface, printers, etc. Those skilled in the art will recognize that any combination of the above components, or any number of different components, peripherals, and other devices known in the art, may be used with the computer 100.

The computer 100 operates under the control of an operating system (OS) 114, such as OS/390™, MVS™, VM™, OS/2™, AIX™, UNIX™, WINDOWS™, MACINTOSH™, etc. The operating system 114 is booted into the memory 104 of the computer 100 for execution when the computer 100 is powered-on or reset. In turn, the operating system 114 then controls the execution of one or more computer programs 116 and 118, described in more detail below.

The present invention is generally implemented in the context of a computer program 116 that invokes functions or procedures in a mathematical function library 118, wherein the function specifically comprises the exponential function.

Generally, mathematical function library 118 is supplemented with a compiler, assembler, or interpreter, and the exponential function is identified by a symbolic representation that is recognized during assembly, compilation, or interpretation. Once identified, the mathematical function library 118 is bound, attached, or made available to the resulting computer program 116, so that the exponential function within the mathematical function library 118 can be invoked or called by the computer program 116.

The computer program 116 may comprise any number of different types of computer programs that have a need for the exponential function. Examples of such programs include spreadsheets (such as EXCEL™), visual mathematical tools (such as MATHEMATICA™), statistical programs, modeling software, data analysis systems, etc. Operators of the computer 100 use a standard operator interface, such as a GUI (graphical user interface), command line, or other similar interface, to transmit electrical signals to and from the computer 100 that represent commands for invoking the computer program 116 that, in turn, invokes the exponential function in the mathematical function library 118.

The operating system 114, computer program 116, and mathematical function library 118 are comprised of data and/or instructions which, when read and executed by the computer 100, cause the computer 100 to perform the steps for performing and/or using the present invention. Generally, the data and/or instructions are embodied in and/or readable from a device, carrier or media, such as memory 104, data storage device 110, and/or a remote device coupled to the computer 100 via the data communications device 112.

However, those skilled in the art will recognize that the exemplary environment illustrated in FIG. 1 is not intended to limit the present invention. Indeed, those skilled in the art will recognize that other alternative hardware environments may be used without departing from the scope of the present invention.

Thus, the present invention may be implemented as a method, apparatus, or article of manufacture using standard programming and/or engineering techniques to produce software, hardware, firmware, or any combination thereof. In addition, the term "article of manufacture" as used herein is intended to encompass logic embodied in or accessible from any device, carrier, or media.

Exponential Tree

Figure 2:
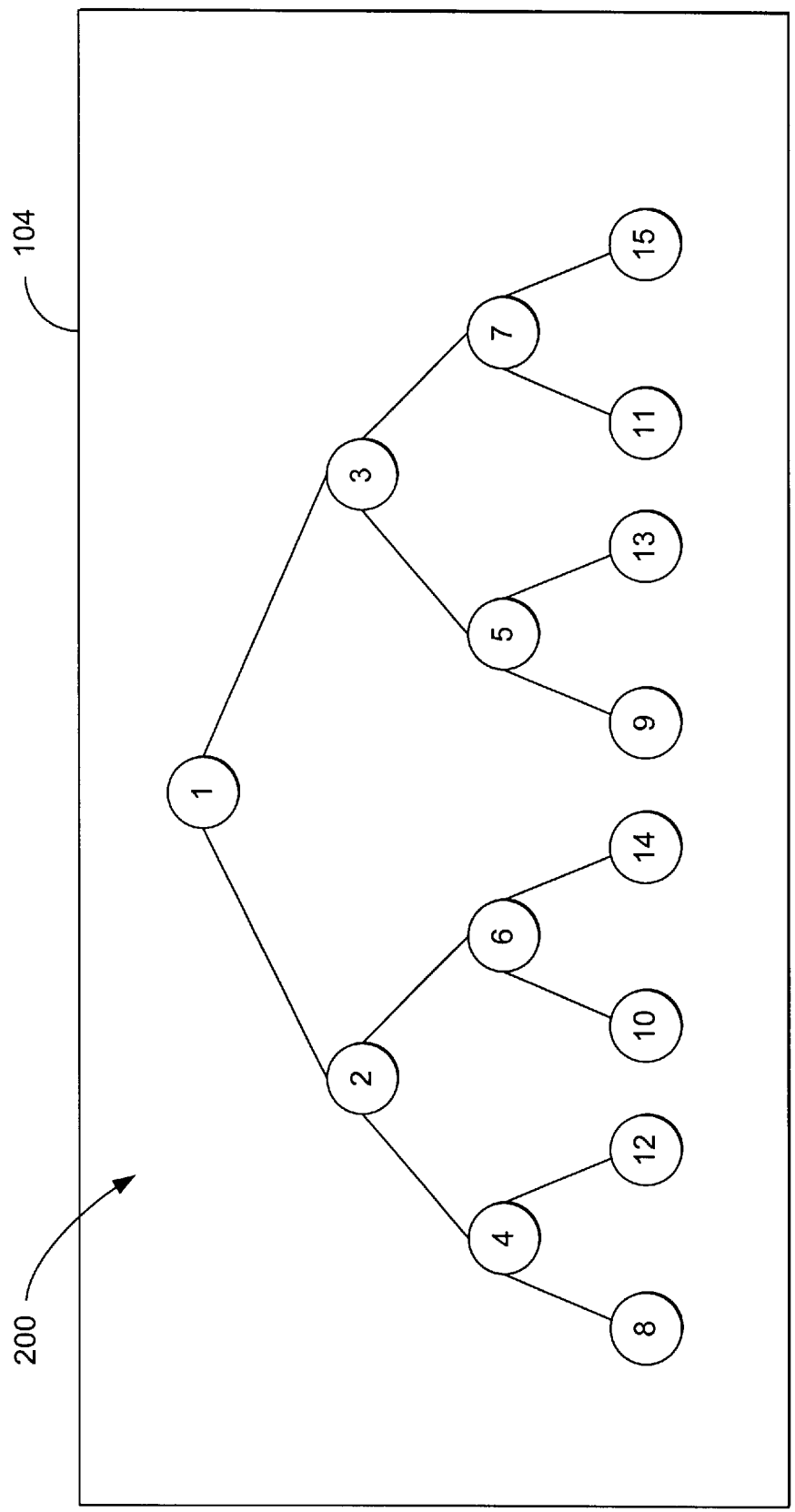
FIG. 2 is a block diagram illustrating an exponential tree generated in accordance with the present invention.

FIG. 2 is a block diagram illustrating an exemplary exponential tree 200 created in accordance with the present invention. In this example, the exponential tree 200 is a one-register power tree. Note the symmetry between the even and odd powers represented in the exponential tree 200: every even node has a corresponding next-higher-value odd node.

To raise X to some desired power N, the node in exponential tree 200 marked with the power N is found as the starting node. (Note that a negative N is treated as a positive N for purposes of the function, with a reciprocal result after completion of the function).

A working value is initialized starting with X. Then, the exponential tree 200 is traversed upwards towards the "root" or "answer" node, i.e., the node marked with "1". For each node encountered during the traversal, the following functions are performed:

(1) If the next node is above and to the right of the current node, then the working value is squared;

(2) If the next node is above and to the left of the current node, then the working value is first squared and the result is then multiplied by X. The above-identified steps are selected according to the zeros and ones (respectively) in the binary representation of N.

The exemplary exponential tree 200 of FIG. 2 is only complete up to N=15. Of course, those skilled in the art will recognize that the tree 200 could be made any size, up to any value of N. Conversely, the size of the exponential tree could be reduced by removing elements from the tree.

Logic of the Exponential Tree Generator

Figure 3:
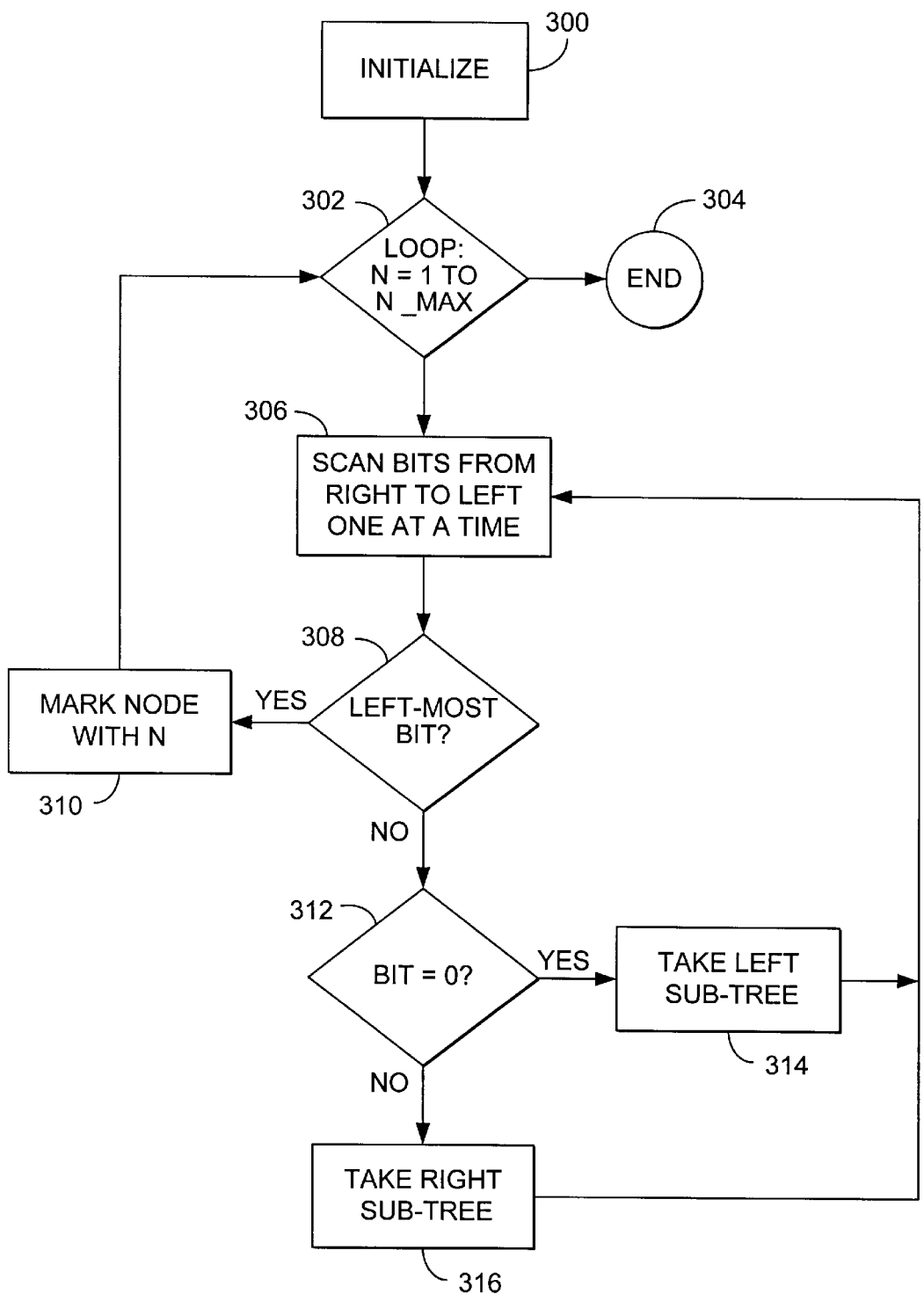
FIG. 3 is a flowchart illustrating the exemplary logic used to generate the exponential tree in accordance with the present invention.

FIG. 3 is a flowchart illustrating the exemplary logic used by the mathematical function library 118 to generate the exponential tree 200 in accordance with the present invention. Those skilled in the art will recognize that the exponential tree 200 may be dynamically generated upon request or may be statically resident in the code space of the mathematical function library 118. Further, those skilled in the art will recognize that the exponential tree 200 may be created by a function within the mathematical function library 118, or by some other function, or by manual programming, typically during creation of the exponentiation function routine.

Block 300 represents the mathematical function library 118 initializing the logic.

Blocks 302–316 together are a loop representing the mathematical function library 118 generating the exponential tree.

Block 302 represents the mathematical function library 118 looping while incrementing the value of N from 1 to NMAX, wherein NMAX represents the highest power implemented by the exponential function. In the example of FIG. 2, NMAX is 15, although those skilled in the art will recognize that NMAX could be any value. Upon termination of the loop, after N reaches the value NMAX, control transfers to Block 304, which terminates the logic.

Block 306 represents the mathematical function library 118 scanning the bits that comprise the value N from right to left, one bit at a time.

Block 308 is a decision block that represents the mathematical function library 118 determining whether the scan of Block 306 has reached the left-most bit of the value N. If so, control transfers to Block 310; otherwise, control transfers to Block 312.

Block 310 represents the mathematical function library 118 marking the node at the current position in the tree with the value N. Thereafter, control transfers back to Block 302.

Block 312 is a decision block that represents the mathematical function library 118 determining whether the bit being scanned is equal to 0. If so, control transfers to Block 314; otherwise, control transfers to Block 316.

Block 314 represents the mathematical function library 118 creating the next node in the tree as a left sub-tree from the current position. Thereafter, control transfers back to Block 302.

Block 316 represents the mathematical function library 118 creating the next node in the tree as a right sub-tree from the current position. Thereafter, control transfers back to Block 302.

Logic of the Exponential Tree Evaluator

Figure 4:
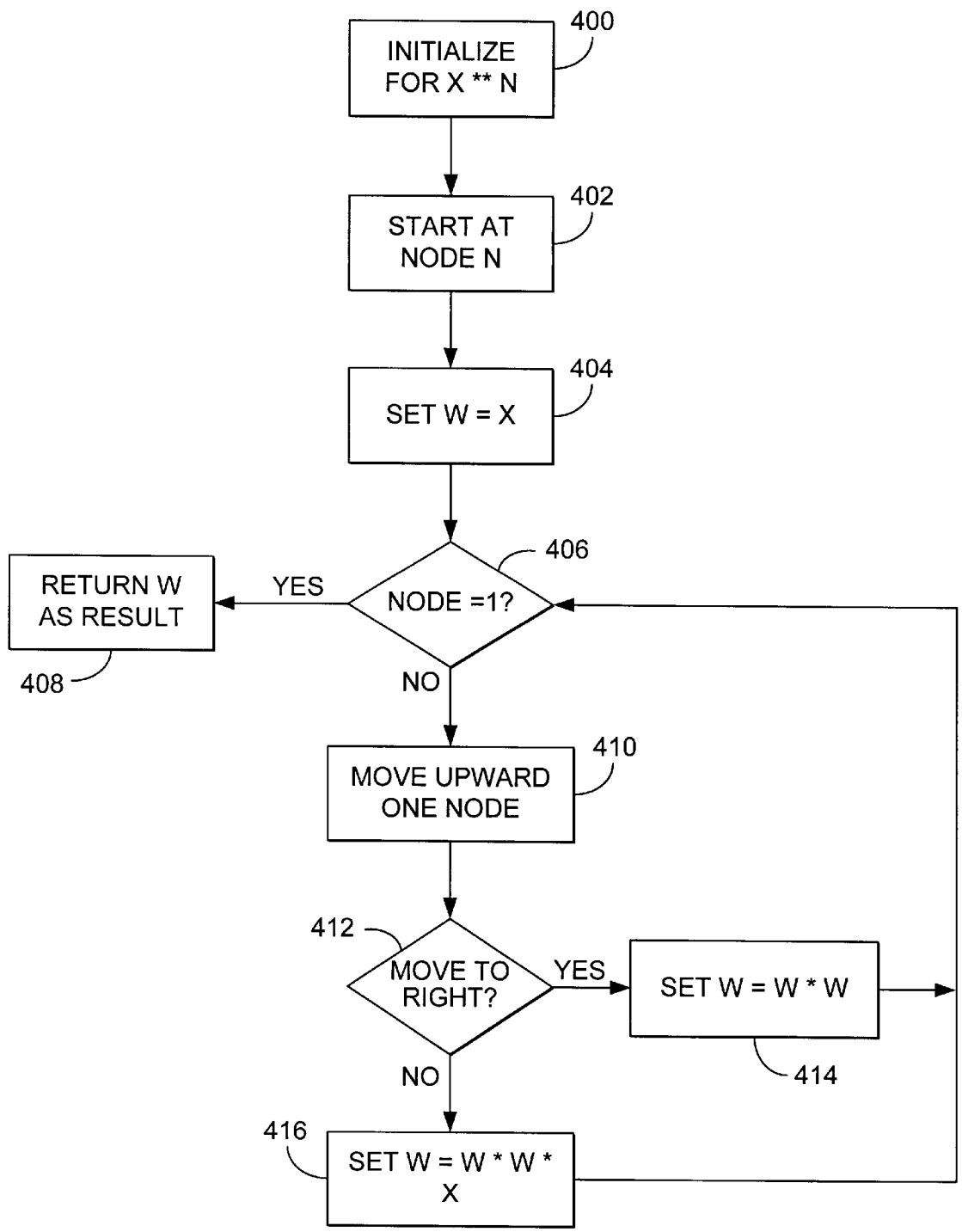
FIG. 4 is a flowchart illustrating the exemplary logic used to perform the exponential function using the exponential tree in accordance with the present invention.

FIG. 4 is a flowchart illustrating the exemplary logic used within the mathematical function library 118 to perform the exponential function using the exponential tree 200 in accordance with the present invention.

Block 400 represents the mathematical function library 118 initializing the exponential function. This Block is executed when the function is invoked. Generally, at least two parameters are passed to the function identifying a base and a power. In this example, X represents the base value and N represents the power value passed to the exponential function, i.e., X**N.

Block 402 represents the mathematical function library 118 positioning at the node in the exponential tree 200 marked with the value of N.

Block 404 represents the mathematical function library 118 setting the value of W to X.

Block 406 is a decision block that represents the mathematical function library 118 determining whether the traversal of the exponential tree 200 has reached the node marked with the value 1 (i.e., the root or answer node). If so, control transfers to Block 408; otherwise, control transfers to Block 410.

Block 408 represents the mathematical function library 118 returning the value of W as the results of X**N.

Block 410 represents the mathematical function library 118 traversing the exponential tree 200 by moving upward one node.

Block 412 is a decision block that represents the mathematical function library 118 determining whether the move upward by node was to the right of the current position. If so, control transfers to Block 414; otherwise, control transfers to Block 416.

Block 414 represents the mathematical function library 118 setting the value of W=W * W. Thereafter, control transfers back to Block 406.

Block 416 represents the mathematical function library 118 setting the value of W=W * W * X. Thereafter, control transfers back to Block 406.

Logic of an Alternative Embodiment

In an alternative embodiment, the exponential tree 200 could be replaced by simple logic within the code space of the mathematical function library 118. Following is exemplary pseudo-code for such logic:

```
START:
IF N=0, RETURN 1.0
SET W=X
GOTO NODE N
NODE 15:
SET W=W * W * X
NODE 7:
SET W=W * W * X
NODE 3:
SET W=W * W * X
NODE 1:
RETURN W
NODE 11:
SET W=W * W
GOTO NODE 7
NODE 13:
SET W=W * W * X
NODE 5:
SET W=W * W
GOTO NODE 3
NODE 9:
SET W=W * W
GOTO NODE 5
NODE 14:
SET W=W * W * X
NODE 6:
SET W=W * W * X
NODE 2:
SET W=W * W
GOTO NODE 1
NODE 10:
SET W=W * W
GOTO NODE 6
NODE 12:
SET W=W * W * X
NODE 4:
SET W=W * W
GOTO NODE 2
NODE 8:
SET W=W * W
GOTO NODE 4
```

Note that the logic corresponds to the logic that operates with the structure of the exponential tree 200. Of course, those skilled in the art will recognize that the logic described above is exemplary only, and that other logic could be used to accomplish the same results. For example, an alternative embodiment could rearrange the logic to minimize the number of GOTO's for certain frequent or expected values of N.

CONCLUSION

This concludes the description of the preferred embodiment of the invention. The following describes some alternative embodiments for accomplishing the present invention.

For example, any type of computer, such as a mainframe, minicomputer, work station or personal computer, could be used with the present invention.

In addition, any number of different types of computer programs that use mathematical functions could benefit from the present invention.

There are several added variations or features of the basic idea of the present invention. For example, overflows can be handled in a way that allows returning information about the exact range of the overflow. Another variation is to add tables of minimum and maximum allowed input values to give rapid underflow/overflow trapping. Yet another variation is that the exponential tree could be implemented in either a data structure or by logic alone.

In summary, the present invention discloses a method, apparatus, article of manufacture, and data structure for performing an exponential function on a base X raised to a power of N in a manner that maximizes computing efficiency. The exponential function initially positions at a starting node in an exponential tree stored in a memory, wherein the starting node represents the value of N. A working value W is created in the memory and the working value W is initially set equal to the base X. The exponential tree is traversed from the starting node to an answer node and the working value W is updated at each node encountered during the traversal. The working value is squared when a next node is above and to the right of the current node. Otherwise, the working value is squared and a result thereof is multiplied by X when the next node is above and to the left of the current node. This working value W is finally outputted as a result of the exponential function.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of performing an exponential function on a base X raised to a power of N in a processor to maximize computational efficiency, the method comprising the steps of:
    (a) positioning at a starting node in an exponential tree stored in a memory of the processor, wherein the starting node represents the value of N;
    (b) creating a working value W in the memory of the processor and setting the working value W equal to the base X;
    (c) traversing the exponential tree in the memory of the processor from the starting node to an answer node and updating the working value W in the memory of the processor at each node encountered during the traversal, wherein the updating step comprises the step of squaring the working value in the memory of the processor when a next node is above and to the right of the current node, and wherein the updating step comprises the step of squaring the working value in the memory of the processor and multiplying a result thereof by X in the memory of the processor when the next node is above and to the left of the current node; and
    (d) outputting the working value W as a result of the exponential function.

2. The method of claim 1, wherein the exponential tree is a one-register power tree.

3. The method of claim 1, wherein even and odd powers are symmetrically represented in the exponential tree.

4. The method of claim 3, wherein every node representing an even power has a corresponding node in the exponential tree representing a next-higher-value odd power.

5. The method of claim 1, wherein the answer node is a node in the exponential tree representing a power value of 1.

6. The method of claim 1, wherein the exponential tree is complete to a specified power value of N.

7. The method of claim 1, further comprising the step of generating the exponential tree in the memory of the processor.

8. The method of claim 1, wherein the traversing step comprises the step of traversing the exponential tree by moving upward one node at a time.

9. The method of claim 1, wherein the traversing step comprises the step of traversing the exponential tree according to a binary representation of N.

10. An apparatus for performing an exponential function on a base X raised to a power of N in a processor to maximize computing efficiency in the processor, comprising:
    (a) a processor, having a memory;
    (b) logic performed by the processor for:
        (1) positioning at a starting node in an exponential tree stored in a memory of the processor, wherein the starting node represents the value of N;
        (2) creating a working value W in the memory of the processor and setting the working value W equal to the base X;
        (3) traversing the exponential tree in the memory of the processor from the starting node to an answer node and updating the working value W in the memory of the processor at each node encountered during the traversal, wherein the updating step comprises the step of squaring the working value in the memory of the processor when a next node is above and to the right of the current node, and wherein the updating step comprises the step of squaring the working value in the memory of the processor and multiplying a result thereof by X in the memory of the processor when the next node is above and to the left of the current node; and
        (4) outputting the working value W as a result of the exponential function.

11. The apparatus of claim 10, wherein the exponential tree is a one-register power tree.

12. The apparatus of claim 10, wherein even and odd powers are symmetrically represented in the exponential tree.

13. The apparatus of claim 12, wherein every node representing an even power has a corresponding node in the exponential tree representing a next-higher-value odd power.

14. The apparatus of claim 10, wherein the answer node is a node in the exponential tree representing a power value of 1.

15. The apparatus of claim 10, wherein the exponential tree is complete to a specified power value of N.

16. The apparatus of claim 10, further comprising logic for generating the exponential tree in the memory of the processor.

17. The apparatus of claim 10, wherein the logic for traversing comprises logic for traversing the exponential tree by moving upward one node at a time.

18. The apparatus of claim 10, wherein the logic for traversing comprises logic for traversing the exponential tree according to a binary representation of N.

19. An article of manufacture embodying logic for performing an exponential function on a base X raised to a power of N to maximize computational efficiency, the logic comprising the steps of:
    (a) positioning at a starting node in an exponential tree stored in a memory, wherein the starting node represents the value of N;
    (b) creating a working value W in the memory and setting the working value W equal to the base X;
    (c) traversing the exponential tree in the memory from the starting node to an answer node and updating the working value W in the memory at each node encountered during the traversal, wherein the updating step comprises the step of squaring the working value in the memory when a next node is above and to the right of the current node, and wherein the updating step comprises the step of squaring the working value in the memory and multiplying a result thereof by X in the memory when the next node is above and to the left of the current node; and
    (d) outputting the working value W as a result of the exponential function.

20. The logic of claim 19, wherein the exponential tree is a one-register power tree.

21. The logic of claim 19, wherein even and odd powers are symmetrically represented in the exponential tree.

22. The logic of claim 21, wherein every node representing an even power has a corresponding node in the exponential tree representing a next-higher-value odd power.

23. The logic of claim 19, wherein the answer node is a node in the exponential tree representing a power value of 1.

24. The logic of claim 19, wherein the exponential tree is complete to a specified power value of N.

25. The logic of claim 19, further comprising the logic of generating the exponential tree in the memory.

26. The logic of claim 19, wherein the traversing logic comprises the logic of traversing the exponential tree by moving upward one node at a time.

27. The logic of claim 19, wherein the traversing logic comprises the logic of traversing the exponential tree according to a binary representation of N.

28. A structure stored in a memory for use in performing an exponential function on a base X raised to a power of N to maximize computational efficiency, wherein the structure comprises an exponential tree and the exponential function (a) positions at a starting node in the exponential tree that represents the value of N, (b) creates a working value W in the memory and sets the working value W equal to the base X, (c) traverses the exponential tree in the memory from the starting node to an answer node and updates the working value W in the memory at each node encountered during the traversal, wherein the exponential function squares the working value in the memory when a next node is above and to the right of the current node and the exponential function squares the working value in the memory and multiplies a result thereof by X in the memory when the next node is above and to the left of the current node, and (d) outputs the working value W as a result of the exponential function.

29. The structure of claim 28, wherein the exponential tree is a one-register power tree.

30. The structure of claim 28, wherein even and odd powers are symmetrically represented in the exponential tree.

31. The structure of claim 30, wherein every node representing an even power has a corresponding node in the exponential tree representing a next-higher-value odd power.

32. The structure of claim 28, wherein the answer node is a node in the exponential tree representing a power value of 1.

33. The structure of claim 28, wherein the exponential tree is complete to a specified power value of N.

34. The structure of claim 28, wherein the exponential function generates the exponential tree in the memory.

35. The structure of claim 28, wherein the exponential tree is traversed by moving upward one node at a time.

36. The structure of claim 28, wherein the exponential tree is traversed according to a binary representation of N.

* * * * *